United States Patent
Chu et al.

(10) Patent No.: US 9,979,710 B2
(45) Date of Patent: May 22, 2018

(54) SINGLE SSID AND DUAL-SSID ENHANCEMENTS

(71) Applicant: STMicroelectronics, Inc., Coppell, TX (US)

(72) Inventors: Liwen Chu, San Ramon, CA (US); George A. Vlantis, Sunnyvale, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 1080 days.

(21) Appl. No.: 13/685,308

(22) Filed: Nov. 26, 2012

(65) Prior Publication Data
US 2014/0029512 A1 Jan. 30, 2014

Related U.S. Application Data

(60) Provisional application No. 61/676,207, filed on Jul. 26, 2012.

(51) Int. Cl.
*H04L 29/06* (2006.01)
*H04W 12/06* (2009.01)
*H04W 84/12* (2009.01)

(52) U.S. Cl.
CPC .......... *H04L 63/08* (2013.01); *H04L 63/0892* (2013.01); *H04L 63/105* (2013.01); *H04L 63/18* (2013.01); *H04W 12/06* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2010/0077179 A1* | 3/2010 | Stillwell, Jr. | G06F 9/3877 712/30 |
| 2012/0072976 A1* | 3/2012 | Patil et al. | 726/6 |
| 2012/0246553 A1 | 9/2012 | Ong | |

(Continued)

OTHER PUBLICATIONS

Aboba, "Virtual Access Points", IEEE 802.11-03/154r0, IEEE P802.11 Wireless LANs, Mar. 27, 2003.*

(Continued)

*Primary Examiner* — Joseph A Bednash
(74) *Attorney, Agent, or Firm* — Seed IP Law Group LLP

(57) ABSTRACT

A wireless local area network system establishes a PASSPOINT™ connection between a mobile station and a hotspot using an enhanced single SSID method or an enhanced dual SSID method. In the dual SSID method, an access point associates and authenticates a mobile device to a secondary SSID of the access point during enrollment and provisioning. After enrollment, the access point authenticates the mobile station to a primary SSID of the access point using the credential that the mobile station received from an online sign-up ("OSU") server in connection with the secondary SSID. In the single SSID method, an access point performs two levels of authentication. During authentication, communications are limited to an 802.1x controlled port running on the mobile station and access point. After a first authentication, communications between the OSU server and the mobile station are unblocked. After the second authentication, all traffic from the mobile station is unblocked.

16 Claims, 6 Drawing Sheets

(56) References Cited

U.S. PATENT DOCUMENTS

2013/0024921 A1     1/2013    Gupta et al.
2013/0276076 A1    10/2013    Gupta et al.
2013/0347073 A1*   12/2013    Bryksa .................. H04L 63/105
                                                                                       726/4

OTHER PUBLICATIONS

IEEE Std 802.11-1997, Information technology—Telecommunications and information exchange between systems—Local and metropolitan area networks—Specific requirements—Part 11: Wireless LAN Medium Access Control (MAC) and Physical Layer (PHY) specifications, 1997, pp. 1-2 and 45-46.*

* cited by examiner

AAA = Authentication, Authorization and Accounting
OSU = Online Sign-Up functionality

SINGLE SSID AND DUAL-SSID ENHANCEMENTS

The present application incorporates by reference U.S. Provisional Patent Application Ser. No. 61/676,207 entitled "SYSTEM AND METHOD FOR SINGLE-SSID AND DUAL-SSID ENHANCEMENTS," filed on Jul. 26, 2012.

TECHNICAL FIELD

The present disclosure is directed, in general, to accessing Wireless Fidelity ("Wi-Fi") hotspots, and more specifically to new systems and methods for accessing Wi-Fi hotspots by authenticating a device using either an enhanced single Service Set Identification ("SSID") method or an enhanced double SSID method.

BACKGROUND

Creating a simple user experience while satisfying Wi-Fi Protected Access version 2 (WPA2) security requirements is difficult for a Wi-Fi Alliance® (WFA) Hotspot 2.0 (HS2.0), particularly for online sign-up. Accordingly, there is a need in the art for improved techniques for online sign-up into WFA HS2.0 hotspots.

SUMMARY

Access to Wireless Fidelity ("Wi-Fi") hotspots' online sign-up involves authenticating a device using either a single Service Set Identification ("SSID") or dual SSID enhancements. The SSID enhancements according to this disclosure address issues that access points have when attempting to authenticate a wireless device to a hotspot in which the device does not match an already-existing subscription.

According to an embodiment of the present disclosure, a method for connecting and authenticating a mobile device to a Wi-Fi hotspot using an enhanced Single SSID includes recording, by each access point and each mobile device, an Online Sign-up Use ("OSU") server's Internet Protocol address ("IP address"). The method also includes performing a first level authentication allowing only traffic to and from the OSU server's IP address by an 802.1x controlled port running on the mobile device and access point. The method further includes performing a second level authentication unblocking all traffic to/from the mobile device, by the 802.1x controlled port on the access point and the mobile device.

In another embodiment, a method for connecting and authenticating a mobile device to a Wi-Fi Hotspot using an enhanced Dual SSID includes implementing, by each Hotspot 2.0 ("HS2.0") access point device, multiple Basic Service Set Identifications ("BSSIDs") and SSIDs, wherein both BSSIDs and SSIDs share a same physical layer. The method also includes using BSSID and SSID fields in management frames as a primary BSSID and a primary SSID. The method further includes defining a Wi-Fi Alliance® ("WFA") vendor specific information element ("IE") to carry secondary BSSID and secondary SSID for online sign-up. The method also includes displaying, for selection by a user, only the primary SSID, wherein the secondary SSID is derived from the primary SSID.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 6B discussed below and the various embodiments used to describe the principles described in this patent document are by way of illustration only and should not be construed in any way to limit the scope of the disclosure. Those skilled in the art will understand that the principles of the disclosure may be implemented in any type of suitably arranged device or system.

WFA HS2.0 hotspots would benefit from a simple process implementing online sign-up by users to utilize the hotspot, particularly for users who are not already subscribers of the hotspot service provider. Online sign-up may utilize either a single service set identification ("SSID") approach and a dual SSID approach, both of which include drawbacks. Dual SSID methods make HS2.0 deployment and operation complex. With a single SSID, however, the access point cannot authenticate the station, and having only one SSID breaks the Robust Security Network (RSN) (also called Wi-Fi Protected Access version 2 (WPA2)) of the basic service set (BSS).

Online Sign-Up Network Architecture

Figure 1:
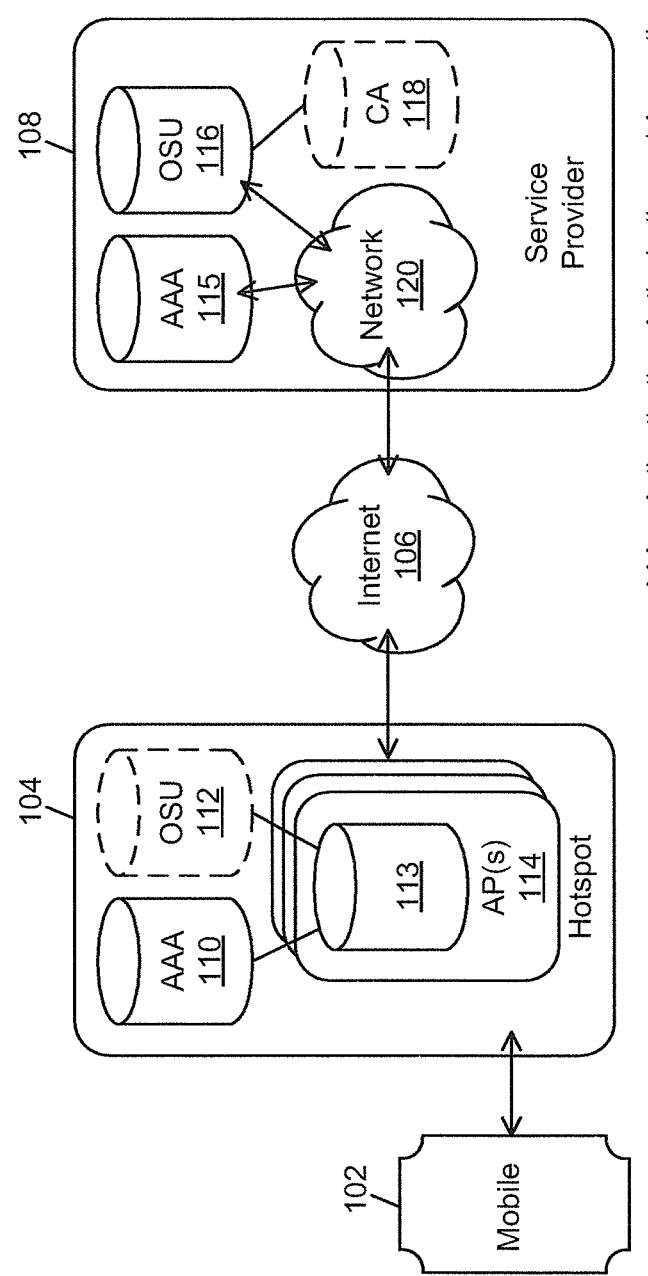
FIG. 1 illustrates a network within which enhancements to online sign-up for wireless hotspot access may be implemented in accordance with the present disclosure.

FIG. 1 illustrates a network within which enhancements to online sign-up for wireless hotspot access may be implemented in accordance with the present disclosure. The network 100 includes a mobile station 102, a hotspot 104 including one or more access points (APs) 114 for connection to the Internet 106, and a service provider 108. The hotspot 104 and the service provider 106 communicate with each other directly or via the Internet 106 in accordance with the known art. Although certain details are depicted and described, it will be understood by those skilled in the relevant art that the network architecture depicted is not limiting, and that other embodiments may include more, less, and/or different components. In addition, those skilled in the art will recognize that the complete structure and operation of a network allowing online hotspot sign-up in accordance with the present disclosure is not depicted in the figures or described herein. Instead, for simplicity and clarity, only so much of the network as is unique to the present disclosure or necessary for an understanding of the present disclosure is depicted and described.

The mobile device 102 is a mobile station ("STA"), also called a "client device" or an "enrollee STA," and may be, for example, a smart phone, a laptop or notebook computer, or a tablet. As noted above, the hotspot 104 includes at least one (possibly more than one) access point ("AP") 114 for WiFi connections to the Internet 106. Each of the WiFi devices depicted in FIG. 1 (mobile device 102 and hotspot 104) includes electrical processing circuitry and a transmitter and a receiver (or, in certain embodiments, a transceiver). The processing circuitry performs the functions of the respective Wi-Fi device with aid from the other components within the Wi-Fi device. The processing circuitry includes a processor coupled to a memory and other components within the Wi-Fi device. The memory includes any suitable storage and retrieval device(s) that can store data and instructions for use by the processor.

The mobile device 102 is configured to communicate with one or more WiFi access points (including hotspot 104) using wireless communications links. For example, the mobile device 102 can be configured to communicate with one or more access points utilizing wireless fidelity ("Wi-Fi") (e.g., IEEE 802.11) communication, BLUETOOTH low energy ("BLE") communication, a near field communication ("NFC"), or any other suitable wireless communications protocol.

The hotspot 104 is configured to implement communications in accordance with the Wi-Fi Alliance® Hotspot 2.0 ("WFA HS2.0") standard. The hotspot 104 is configured to use WFA HS2.0 procedures to associate with one or more STAs (including mobile device 102) that attempt to associate with the hotspot 104. The hotspot 104 includes storage (e.g., a memory) 113, an Authentication, Authorization and Accounting (AAA) function 110, and an online sign-up (OSU) function 112. In the example shown, the AAA function 110 and the OSU function 112 are coupled to common storage 113. The AP(s) 114 within hotspot 104 are configured to perform at least one authentication, authorization and accounting process with the cooperation of the AAA function 110 and an online sign-up process using the OSU function 112. The AAA function 110 and the OSU function 112 may need to communicate with the counterpart AAA function 115 and OSU function 116 within the service provider network 108.

According to the present disclosure, a mobile device 102 attempts to join (i.e., associate with) the hotspot 104. In order to join the hotspot 104, the mobile device 102 is required to be registered with (i.e., to have an existing service subscription to) the service provider servicing or serviced by the hotspot if the mobile device does not have a contract with the service provider.

In the present disclosure, the service provider 108 also includes an AAA function 115 and an OSU function 116, and is configured to perform at least one authentication, authorization and accounting process using the AAA function 115 and to perform an OSU process using the OSU function 116. Within service provider 108, the OSU function 116 is communicably coupled to a Certification Authority (CA) 118 (which may be within or co-located with the service provider system 108 in certain embodiments). The service provider 108 also includes a communication interface (network 120 in the example shown) configured to communicate via the Internet 106.

The network 100 of FIG. 1 includes capabilities advertisement in accordance with WFA HS2.0 Phase 1, which enables network discovery by mobile devices and, in turn, allows information about roaming partners and online sign-up capabilities to be advertised and made available via Institute for Electrical and Electronic Engineers (IEEE) 802.11u and extensions.

The present disclosure includes a proposal for an WFA HS2.0 Phase 2 Online Sign-up and Operator Policy. The disclosure includes an Enrollment Protocol supporting online sign-up for a user who does not have an existing account with a service provider and needs to establish an account with corresponding credentials. Provision of such credentials enables access via secure RSN connection to the wireless local area network (WLAN) including the hotspot 104. A Simple Object Access Protocol ("SOAP") method is defined. A new Open Mobile Alliance Device Management (OMA DM) method is also defined.

OSU Use Case in WFA HS2.0

Figure 2:
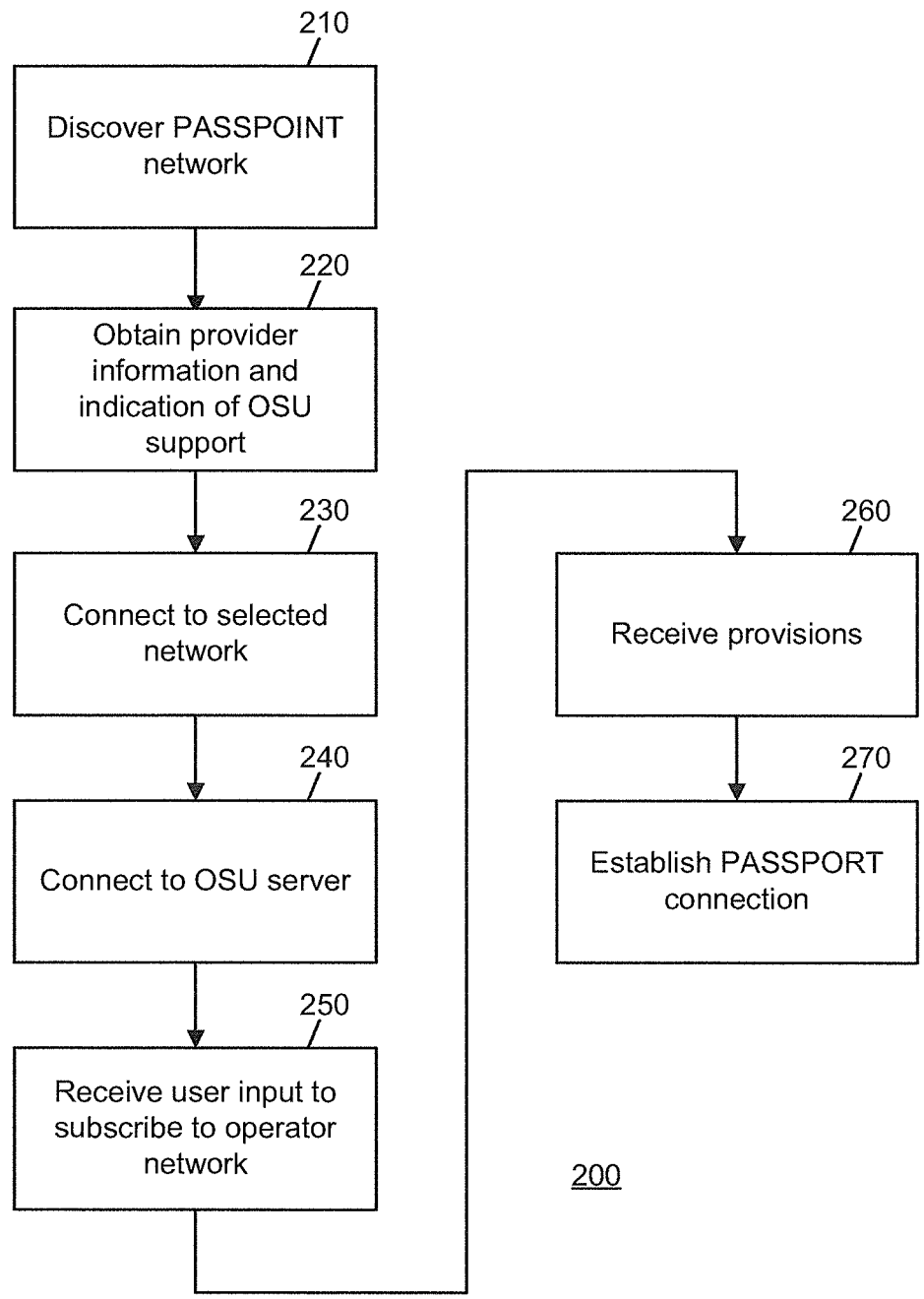
FIG. 2 is a high level flowchart for a process of online sign-up for wireless hotspot access.

FIG. 2 is a high level flowchart for a process of online sign-up for wireless hotspot access. The process 200 is performed within a WFA HS2.0 network (also called a PASSPOINT™ network, including at least one access point and one or more mobile devices that have passed the PASSPOINT™ certification test based on the Wi-Fi Alliance® Hotspot 2.0 Specification) enhanced as described in the present disclosure. The WFA HS2.0 network also needs to communicate with the service provider network. The process 200 is thus performed within a network that allows for roaming Wi-Fi hotspot access, such as the network of FIG. 1.

In the process 200 of FIG. 2, the client or mobile device discovers a PASSPOINT™ network that does not match an existing subscription in the client device (step 210). Information about available wireless access providers and an indication of OSU support (if any) for each such provider are obtained by the client device (step 220), which displays at least the available ad hoc or impromptu sign-up providers of wireless access (those not requiring a pre-existing subscription) to the user of the client device based on that information.

When the user selects a network providing wireless access with OSU support in the vicinity of the client device (that is, the user selects one of the displayed online sign-up networks), the client device connects to the network (step 230) to access the selected OSU server. Rephrased, the user selection acts as an instruction to the client device to attempt to establish a connection to the selected OSU network.

When the client device establishes a connection to the OSU server (step 240), the user can then subscribe to the operator network (step 250). The client device receives the user input for subscribing to an operator network. The client device is then provisioned by the OSU server with username and password credentials (step 26) and policy and, after being provisioned, establishes a wireless connection to the Internet for the client device (step 270). In establishing a wireless connection to the Internet, the client drops the connection to the online sign-up server and re-establishes a new connection via hotspot 104.

Dual SSID Proposals

Figure 3A:
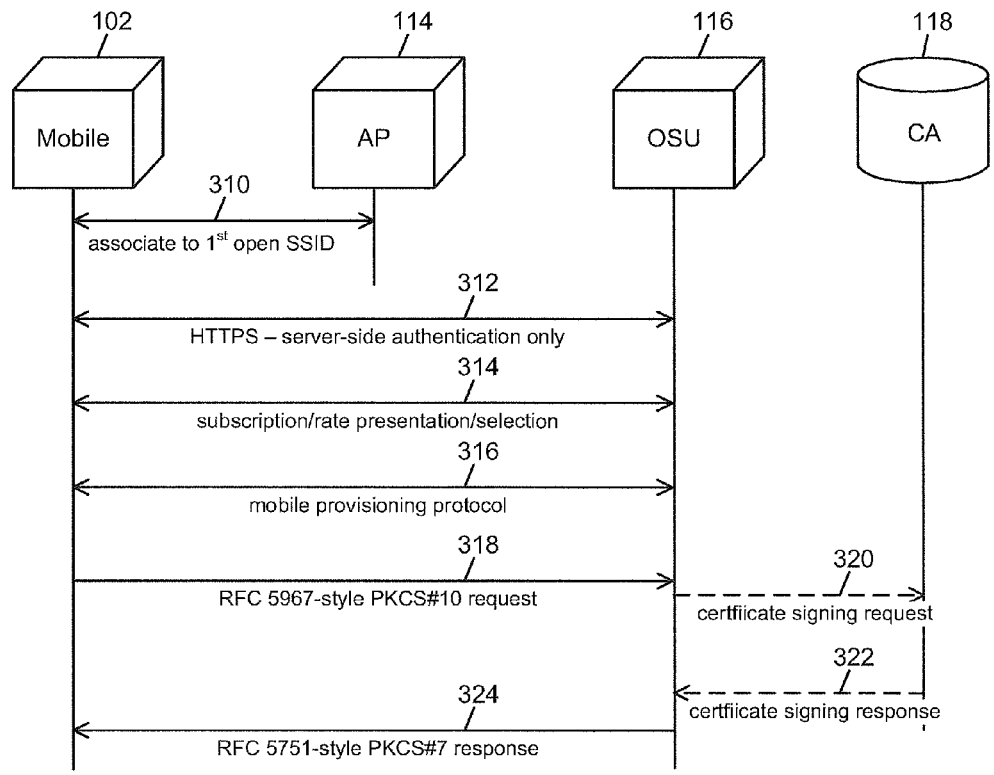
FIGS. 3A and 3B illustrate timing diagrams for a process of online sign-up using dual SSIDs to provision and enroll a client device for access a network wireless hotspot of a service provider and to connect to an access point of a secured wireless local area network.
Figure 3B:
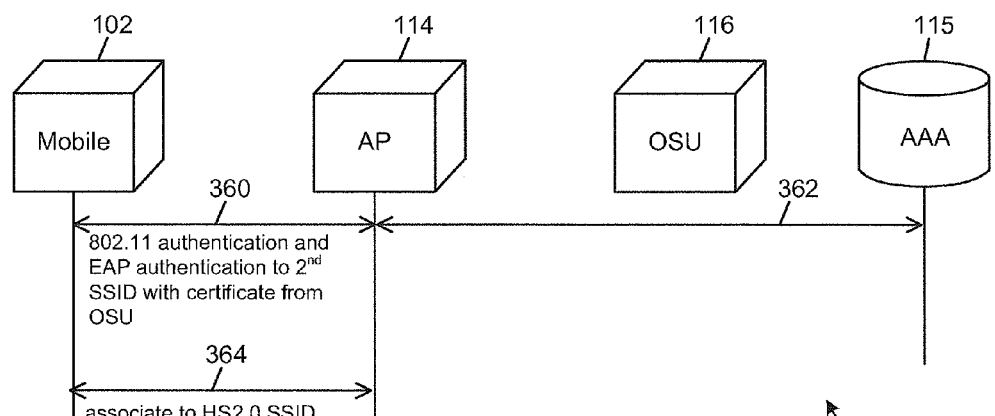

FIGS. 3A and 3B illustrate timing diagrams for a process of online sign-up using dual service set identifications ("SSIDs") to provision and enroll a client device for access a network wireless hotspot of a service provider and connecting to an access point of a secured wireless local area network. FIG. 3A corresponds generally to steps 210-260 in FIG. 2, while FIG. 3B corresponds generally to step 270.

FIG. 3A illustrates a timing diagram 300 for using dual SSIDs to provision and enroll a client device attempting to access a service provider's network. In the various embodiments with dual SSIDs described herein, typically a first SSID is used for online sign up and a second SSID is used for accessing the service provider's network. Provisioning and enrollment can be implemented using a mobile device 102, an access point or hotspot 104, an online sign-up server 116 for the service provider and a Certification Authority 118 for the service provider.

The mobile device 102 first requests an association with the access point(s) 114 using a first SSID plus a first BSSID and, in response, the AP(s) 114 create an association with the mobile device 102 using the first SSID plus the first BSSID, represented by signals 310 (aggregated for simplicity and clarity). The mobile device 102 is then permitted to securely communicate with the OSU server 116 solely for HTTPS server-side authentication, as represented by signal(s) 312 (one or more signals, in either or both directions, may be involved). The OSU server 116 sends one or more subscription options and presents one or more plan rates to the mobile device 102, represented by signal(s) 314, and a user of the mobile device 102 selects a subscription and accepts the associated rate presented. The selected subscription option is then sent from the mobile device 102 to the OSU server 116.

Upon receiving a subscription option selection, the OSU server 116 provisions the mobile device 102 with a username credential, a password credential, and a policy, as represented by signal(s) 316. After being provisioned, the mobile device 102 issues (i.e., sends) a certification request to the OSU server 116, represented by signal 318. The certification request is, for example, an Internet Engineering Task Force (IEFT) Request for Comments (RFC) 5967-style Public Key Cryptography Standards (PKCS) #10 request. In response, the OSU server 306 communicates (i.e., forwards) the certificate signing request 320 to the CA 118. The CA 118 authenticates the mobile device 102 and responds 322 to the OSU server 116 which, upon receiving the response 322, sends a certification response 324 to the mobile station 102. The certification response 324 is, for example, an RFC 5751-style PKCS#7 response and signed certificate. At this point, the mobile device 102 is considered enrolled and authorized to access the service provider's network via the access point 114.

FIG. 3B is a timing diagram 350 for a remainder of the process. Once authorized to connect to AP 114, a PASSPOINT™ connection is to be established and the mobile station 102 will disconnect from the online sign-up server 116, requiring a new connection to be re-established. Thus, after enrollment is completed and the connection to the OSU server 116 is dropped (i.e., disconnected), the mobile device 102 connects to the secured WLAN network's AP 114 using a second SSID plus a second BSSID and using the provisioned credentials issued by the CA 118 in FIG. 3A. The mobile device 102 establishes a two-way communication (i.e., connects) with AP 114 using the second SSID plus the second BSSID and the certificate provided by the OSU server 116 in the signals depicted in FIG. 3A, using IEEE 802.11 Authentication and Extensible Authentication Protocol ("EAP") authentication as represented by signal(s) 360. Upon connection of the client mobile device 102 to the AP 114, the AP 114 verifies the credentials provided with an Authentication, Authorization, and Accounting Server ("AAA") 115, as represented by the signal(s) 362. If the AAA 115 accepts (validates) the credentials, then the AAA 115 sends a notification of acceptance to the AP 114. Provided that the credentials are accepted by the AAA 115, the AP 114 and the mobile device 102 are then associated using the (second) HS2.0 SSID plus the second BSSID, as represented by signals(s) 364.

With the dual SSID proposal discussed above, one SSID plus one BSSID is used for online sign up and another, different SSID plus another, different BSSID is used for accessing the service provider's network. Provisioning and enrollment proceed as depicted in FIG. 3A and, after enrollment, the client device connects to secure WLAN network using the provisioned credential as illustrated by FIG. 3B.

There are some disadvantages of using dual SSIDs with HS2.0. For example, using two SSIDs plus two BSSIDs can make HS2.0 deployment and operation more complex for service providers. Moreover, creating a "simple user experience" with two SSIDs plus two BSSIDs can also be more difficult than using a single SSID plus a single BSSID. Additionally, the use of two SSIDs plus two BSSIDs increases congestion by doubling the number of BEACON frames as well as increasing the number of Probe Request frames and response frames thereto. Where one access point provides a worse connection while a second access point provides a better connection for the mobile device, the coverage of the two Basic Service Sets ("BSSs") may possibly be different, as well. Additional time needed for scanning for the second BSS after online sign-up is another consideration.

Dual SSID Enhancement

Figure 4A:
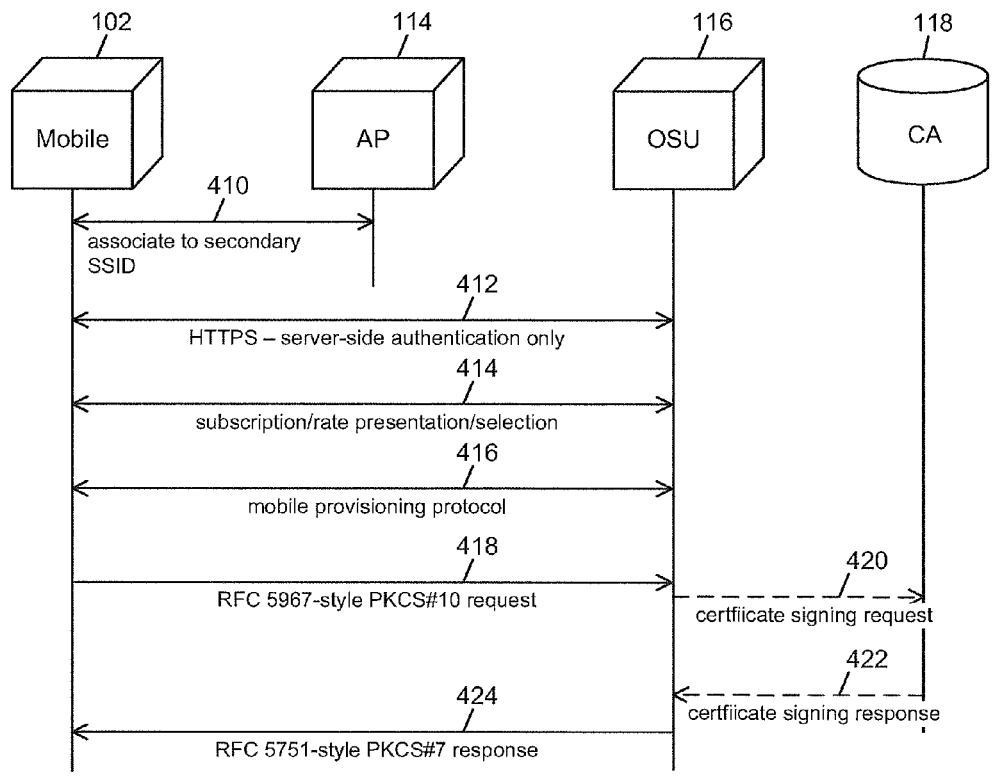
FIGS. 4A and 4B illustrate timing diagrams for an enhanced process of online sign-up using dual SSIDs to provision and enroll a client device for access a network wireless hotspot of a service provider and to connect to an access point of a secured wireless local area network in accordance with the present disclosure.
Figure 4B:
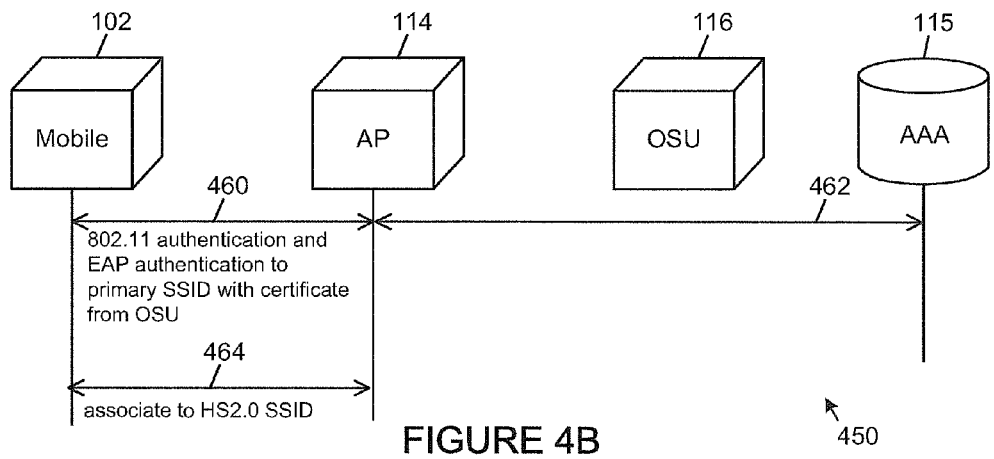

FIGS. 4A and 4B illustrate timing diagrams for an enhanced process of online sign-up using dual SSID to provision and enroll a client device for access a network wireless hotspot of a service provider and connecting to an access point of a secured wireless local area network in accordance with the present disclosure.

For the dual SSID process enhancement illustrated by FIGS. 4A and 4B, each HS2.0 AP 114 implements multiple BSSIDs (a primary BSSID and a secondary BSSID) and multiple SSIDs (a primary SSID and a secondary SSID), sharing the same physical (PHY) layer. The values used in the BSSID and SSID fields in management frames (e.g., beacons) are the primary BSSID and the primary SSID (e.g., "Starbucks" or "AT&T"). The primary SSID determines the secondary SSID, and the primary SSID and the secondary SSID have a one-to-one correspondence. There are two methods to define the one-to-one matching between the primary SSID and the secondary SSID: One method is that a WFA Vendor Specific Information Element (IE) is defined to carry the secondary BSSID and the secondary SSID for online sign-up. This can differentiate the OSU's secondary BSSID from other BSSIDs when the AP supports the online sign-up and multiple BSSID features in IEEE 802.11 2012. In the Vendor Specific Information Element (IE), there are two SSIDs and two BSSIDs. One SSID is the primary SSID (e.g. the first SSID in the IE) and another SSID (e.g. the second SSID in the IE) is the secondary SSID. One BSSID (the first BSSID in the IE) is the primary BSSID and another BSSID (e.g. the second BSSID in the IE) is the secondary SSID.

With the Vendor Specific IE method, the legacy STAs that do not implement communications according to the HS 2.0 specification cannot decode the WFA Vender Specific IE, thus making the secondary SSID and BSSID transparent to the legacy STAs that do not implement HS 2.0 communications. The secondary SSID and secondary BSSID are created automatically by the HS 2.0 AP 114. The management burden is not increased for HS 2.0 hot spot operators and service providers. The secondary SSID and BSSID are never disclosed to the users of HS 2.0 STA. Only the primary SSID and primary BSSID are disclosed to the user of HS2.0 STA. The secondary SSID and secondary BSSID are totally transparent to the user of HS2.0 STA.

Another method is that WFA HS specification defines how to create secondary SSID from the primary SSID. For example, the secondary SSID for one implementation may be defined as "HS-PreSecure-" plus the primary SSID. For the exemplary primary SSID indicated above, the secondary SSID would then be "HS-PreSecure-Starbucks" and "HS-PreSecure-AT&T", respectively). Likewise, the primary BSSID decides the secondary BSSID, and the primary BSSID and the secondary BSSID have a one-to-one correspondence as defined by HS specification, e.g., the secondary BSSID may be defined as the value of the primary BSSID+1.

With the matching method defined by the HS 2.0 specification, the legacy STA that does not implement HS 2.0 communication cannot know the secondary SSID/BSSID from the primary SSID/BSSID. So the secondary SSID and BSSID are transparent to the legacy STAs that do not implement HS 2.0 communication. The secondary SSID and secondary BSSID are created automatically by the HS 2.0 AP 114. The management burden is not increased to HS 2.0 hot spot operators and service providers. The secondary SSID and BSSID are never disclosed to the users of HS 2.0 STA. Only the primary SSID and primary BSSID are disclosed to the user of an HS2.0 STA. The secondary SSID and secondary BSSID are totally transparent to the user of the HS2.0 STA.

The timing diagrams 400 and 450 of FIGS. 4A and 4B relate to a client device 402 attempts to access a service provider's network by selecting a "primary" SSID—that is, the only SSID of a primary-secondary linked pair of SSIDs that is displayed to the user is the primary SSID. Despite display and selection of the primary SSID, the secondary SSID of the SSID pair plus the secondary BSSID is actually used for online sign up to acquire the policy and security information from the service provider's on-line sign-up servers before accessing the service provider's network.

Because the primary SSID plus the primary BSSID is only used for data communication after two-way RSN authentication (i.e., the STA authenticates the AP and the AP authenticates the STA) is passed, the requirements of a RSN are satisfied. The user selects the primary SSID (plus the primary BSSID), but the STA (mobile device 102) first authenticates (that is, the STA authenticates the AP) and associates using the secondary SSID plus the secondary BSSID for communicating with OSU 116. After finishing the authentication and association with the secondary SSID plus the secondary BSSID, the state shown to user is simply "association on going."

After communicating with the OSU 116, the STA 102 associates and authenticates with the AP 114 within hotspot 104 using the primary SSID plus the primary BSSID, and the association with the secondary SSID (plus the secondary BSSID) is automatically broken. After finishing the authentication and association with the AP 114 using the primary SSID plus the primary BSSID, the state shown to user is "association complete."

The RSN Information Element (IE) within the beacon frame is also used for legacy STAs (those not employing the enhanced dual SSID process described in connection with FIGS. 4A and 4B) within the BSS. The legacy STAs only perform authentication and association using the primary SSID plus the primary BSSID. A WFA Vendor Specific IE may be included to carry the secondary BSSID, the secondary SSID, the RSN information for secondary BSSID, to help legacy STAs since the legacy STAs cannot decode the secondary BSSID and the secondary SSID for the OSU 116. To legacy STAs, the secondary BSSID and the secondary SSID do not have influence over authentication and association.

In the processes illustrated in FIGS. 4A and 4B, provisioning and enrollment is implemented using a mobile device 102 communicating with the AP 114 and OSU 116 in the same manner as FIGS. 3A and 3B using the secondary SSID plus the secondary BSSID, although the associated primary SSID (and optionally also the primary BSSID) is displayed to (and selected by) the user on the mobile device 102. Thus, the signals 410, 412, 414, 416, 418, 420, 422, 424, 460, 462 and 464 are employed in enrollment and access processes in the same manner as the above-described signals 310, 312, 314, 316, 318, 320, 322, 324, 360, 362 and 364, respectively. The secondary SSID plus the secondary BSSID is employed as the "first" SSID (and "first" BSSID) described above in connection with FIG. 3A for the purposes of signals 410, 412, 414, 416, 418, 420, 422, and 424 in FIG. 4A; the primary SSID plus the primary BSSID is employed as the "second" SSID (and "second" BSSID) described above in connection with FIG. 3B for the purposes of signals 460, 462, and 462 in FIG. 4B.

In the embodiment of FIGS. 4A and 4B, with the use of dual SSIDs, the primary SSID determines the secondary SSID and has a one-to-one correspondence with the secondary SSID. Likewise, the primary Basic Service Set Identification (BSSID) determines the secondary BSSID, and the primary and secondary BSSID have one-to-one correspondence. The enhanced dual SSID deployment of FIGS. 4A and 4B is thus no more difficult for the operator to deploy than a single SSID deployment, since software automatically generates the secondary SSID and the secondary BSSID.

Another advantage to the enhanced dual SSID deployment of FIGS. 4A and 4B is that, rather than multiple BEACON frames being necessary, only one BEACON frame is used. Additionally, no additional Probe Requests or Responses are required for the secondary SSID (and the secondary BSSID). The two BSSs defined by the primary SSID (and primary BSSID) and the secondary SSID (and secondary BSSID) always have the same coverage and the same Timer Synchronization Function ("TSF") and IEs, except in certain circumstances where there is a possibility of adding an RSN for the secondary SSID and the secondary BSSID. From the user's perspective, using enhanced dual SSIDs maintains the simple user experience of the single SSID.

Single SSID Proposals

Figure 5A:
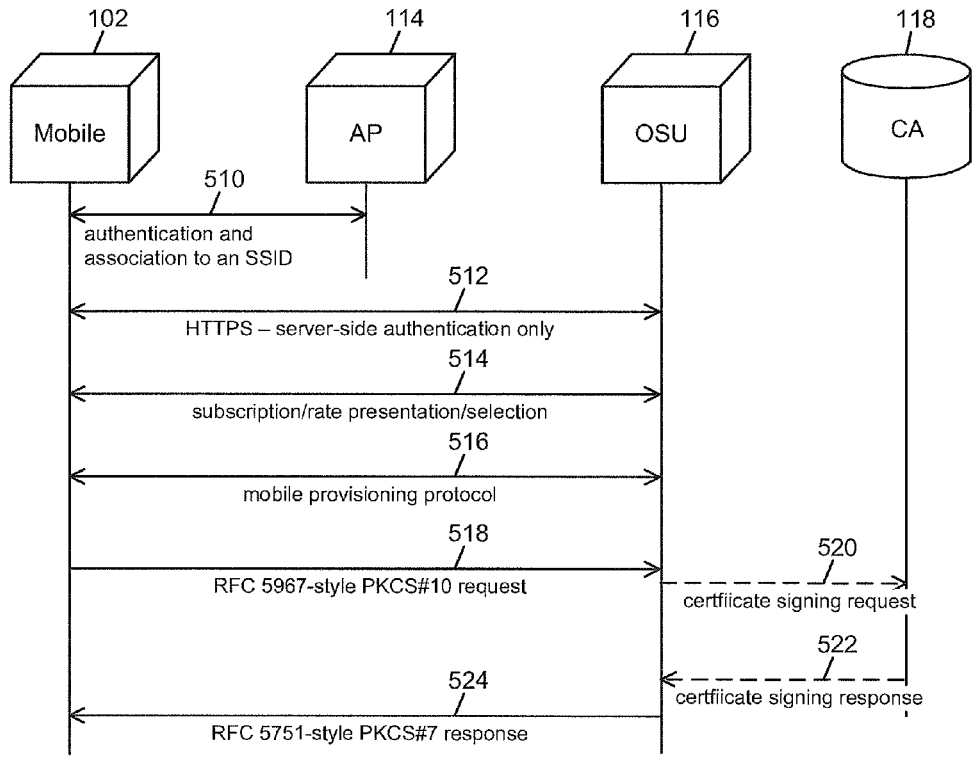
FIGS. 5A and 5B illustrate timing diagrams for a process of online sign-up using a single SSID to provision and enroll a client device for access a network wireless hotspot of a service provider and to connect to an access point of a secured wireless local area network.
Figure 5B:
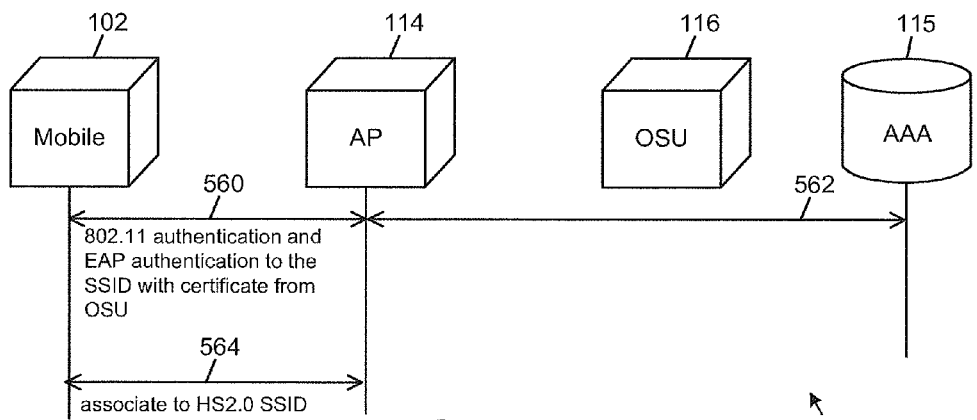

FIGS. 5A and 5B illustrate timing diagrams for a process of online sign-up using a single SSID to provision and enroll a client device for access a network wireless hotspot of a service provider and to connect to an access point of a secured wireless local area network. The timing diagrams 500 and 550 relate to an embodiment using a single SSID for provisioning and enrolling a client device attempting to access a service provider's network, and for connecting the client once enrolled. As apparent, the signals 510, 512, 514, 516, 518, 520, 522, 524, 560, 562 and 564 are employed in enrollment and access processes in the same manner as the above-described signals 310, 312, 314, 316, 318, 320, 322, 324, 360, 362 and 364, respectively. The single SSID (plus the single BSSID) is employed as both the "first" SSID described above (and the "first" BSSID) in connection with FIG. 3A for the purposes of signals 510, 512, 514, 516, 518, 520, 522, and 524 in FIG. 5A and the "second" SSID described above (and the "second" BSSID) in connection with FIG. 3B for the purposes of signals 560, 562, and 562 in FIG. 5B.

For single SSID online sign-up enrollment and access processes, one SSID (plus one BSSID) is used both for online sign up and for accessing the service provider's network. Provisioning and enrollment proceed as depicted in FIG. 5A. After enrollment, the client device connects to the secure WLAN network using the provisioned credential in the manner illustrated in FIG. 5B.

Among the issues with single SSID processes are: that a single SSID (and a single BSSID) breaks RSN/WPA2 for the BSS, because the AP cannot authenticate the STA during the enroll procedure as illustrated in FIG. 5A; "HS2.0 Release 1" APs will meet RSN/WPA2 requirements, but "HS2.0 Release 2" APs will no longer meet those requirements if a single SSID (plus a single BSSID) is used; and "HS2.0 Release 2" APs with a single SSID (and a single BSSID) introduce a technical security risk and a WPA2 brand dilution risk for WFA. Moreover, the client may need to re-scan WLAN upon disassociation if a single SSID (and a single BSSID) is used.

Single SSID Enhancement

Figure 6A:
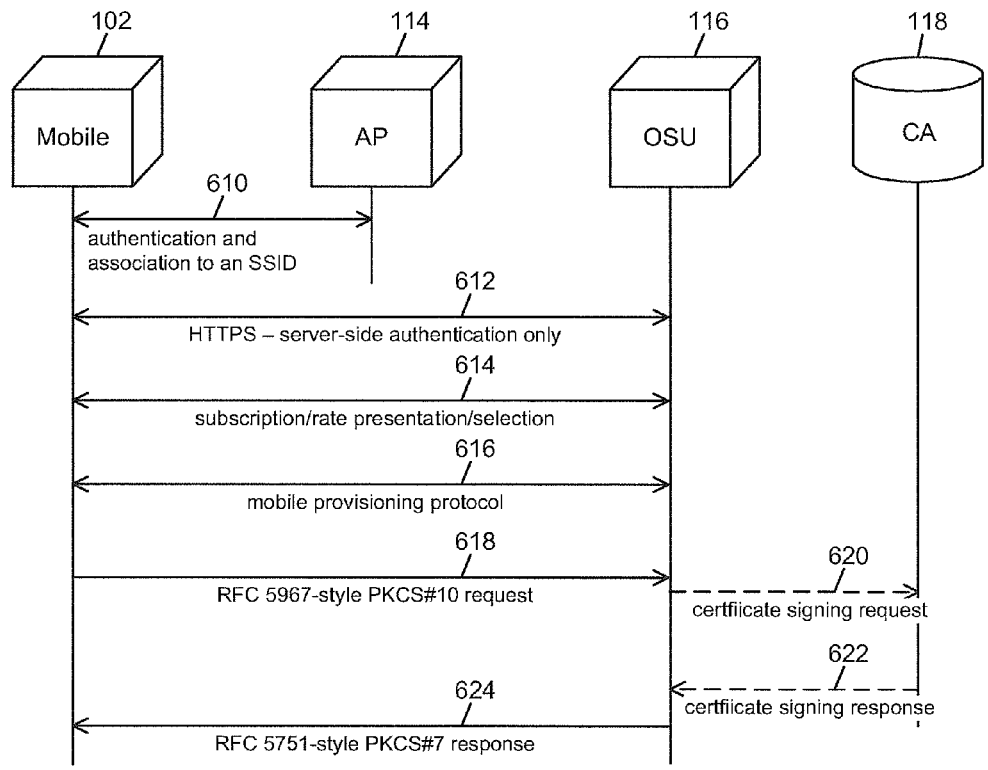
FIGS. 6A and 6B illustrate timing diagrams for an enhanced process of online sign-up using a single SSID to provision and enroll a client device for access a network wireless hotspot of a service provider and to connect to an access point of a secured wireless local area network in accordance with the present disclosure.
Figure 6B:
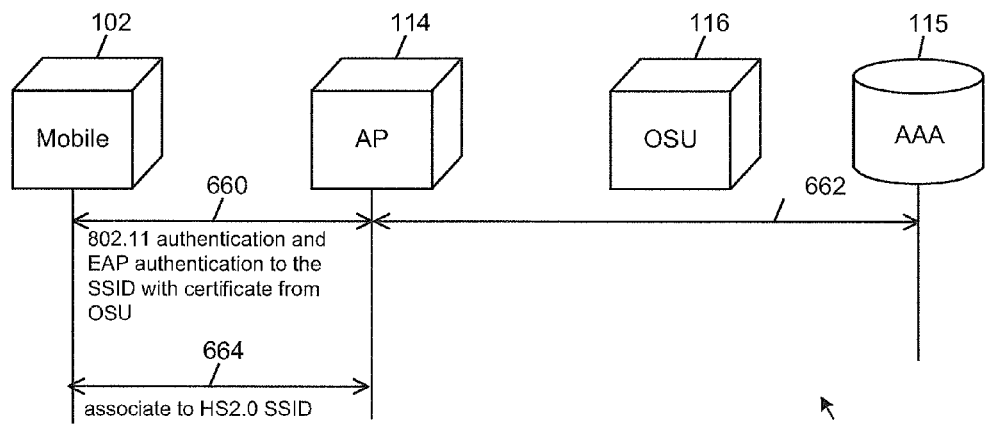

FIGS. 6A and 6B illustrate timing diagrams for an enhanced process of online sign-up using a single SSID to provision and enroll a client device for access a network wireless hotspot of a service provider and to connect to an access point of a secured wireless local area network in accordance with the present disclosure. The timing diagrams 600 and 650 relate to an embodiment using a single SSID (plus a single BSSID) for provisioning and enrolling a client device attempting to access a service provider's network, and for connecting the client once enrolled. As apparent, the signals 610, 612, 614, 616, 618, 620, 622, 624, 660, 662 and 664 are employed in enrollment and access processes in the same manner as the above-described signals 310, 312, 314, 316, 318, 320, 322, 324, 360, 362 and 364, respectively. The single SSID (and the single BSSID) is employed as both the "first" SSID described above (and the "first" BSSID) in connection with FIG. 3A for the purposes of signals 610, 612, 614, 616, 618, 620, 622, and 624 in FIG. 6A and the "second" SSID described above (and the "second" BSSID) in connection with FIG. 3B for the purposes of signals 660, 662, and 662 in FIG. 6B.

In the enhanced single SSID embodiments illustrated by FIGS. 6A and 6B, each AP and the STA records an OSU server's Internet Protocol (IP) address that the AP has serviced. Two levels of authentication are defined, with the 802.1x controlled port unblocking different traffic streams in level one and level two: After a first authentication (the first level authentication) represented by signal(s) 610, the 802.1x controlled port running at the STA 102 and at the AP 114 only allow traffic to/from the IP address of the OSU server 116. In addition, the STA 102 and the AP 114 unblock a predefined number of IP packets from the STA 102 to the OSU server 116 and from OSU server 116 to the STA 102, which predefined number takes into consideration the possibility of IP packet fragmentation and/or retransmission. Such an IP packet header check is reasonable since the current AP and STA implementation already requires checks of each data frame's EtherType, payload type for tunneled direct link setup (TDLS), and fast session transfer (FST) information. With the above-defined constraints, the STA 102 only transmits IP packets to the OSU server 116 and receives IP packets from the OSU server 116 via the AP 114, and only of limited numbers. In this manner, the enhanced single SSID online sign-up and access processes maintain satisfaction of RSN/WPA2 requirements for the BSS, so that "HS2.0 Release 2" APs would meet RSN/WPA2 security.

After a second authentication (the second level authentication) represented by signal(s) 660, the 802.1x controlled port running on the AP and the STA unblock all the traffic from the STA 10. Note that the figure labeled "Relationship between state and services" in the specification for IEEE 802.11™ 2012 should be changed accordingly.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of non-transitory storage medium capable of being accessed by a computer, such as read only memory ("ROM"), random access memory ("RAM"), a hard disk drive, a compact disc ("CD"), a digital video disc ("DVD"), or any other type of memory.

It may be advantageous to set forth definitions of certain words and phrases. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
receiving at a station from an access point both a primary service set identification for the access point and a secondary service set identification for the access point, wherein the primary service set identification and the secondary service set identification have a one-to-one correspondence, and wherein the secondary service set identification is different from the primary service set identification and derived from the primary service set identification, the secondary service set identification stored in an information element hidden from a user of the station;

while displaying only the primary service set identification to the user of the station, employing the secondary service set identification for online sign-up of the station for service at the access point; and after receiving a certificate generated for the station, using the primary service set identification to establish access for the station via the access point.

2. The method of claim 1, wherein a basic service set of the primary service set identification and the secondary service set identification have a same coverage area, a same time synchronization function, and a same Information Element.

3. The method of claim 1, further comprising:
receiving a vendor specific information element indicating correspondence between the primary service set identification and the secondary service set identification and correspondence between a primary basic service set identification and a secondary basic service set identification for online sign-up.

4. The method of claim 1, further comprising:
using the secondary service set identification to communicate via the access point with an online sign-up server during online sign-up.

5. A method, comprising:
providing to a station from an access point both a primary service set identification for the access point and a secondary service set identification for the access point, wherein the primary service set identification and the secondary service set identification have a one-to-one correspondence, and wherein the secondary service set identification is different from the primary service set identification and derived from the primary service set identification, the secondary service set identification stored in an information element hidden from a user of the station;
receiving communications at the access point from the station employing the secondary service set identification for online sign-up of the station for service at the access point;
receiving at the access point a certificate generated for the station; and
using the primary service set identification and the certificate to establish access for the station via the access point.

6. The method of claim 5, wherein a basic service set of the primary service set identification and the secondary service set identification have a same coverage area, a same time synchronization function, and a same Information Element.

7. The method of claim 5, further comprising:
transmitting a vendor specific information element indicating correspondence between the primary service set identification and the secondary service set identification and correspondence between a primary basic service set identification and a secondary basic service set identification for online sign-up.

8. The method of claim 5, further comprising:
receiving communications from the station using the secondary service set identification to communicate via the access point with an online sign-up server during online sign-up.

9. A station, comprising:
a controller configured to receive from an access point both a primary service set identification for the access point and a secondary service set identification for the access point, wherein the primary service set identification and the secondary service set identification have a one-to-one correspondence, and wherein the secondary service set identification is different from the primary service set identification and derived from the primary service set identification, the secondary service set identification stored in an information element hidden from a user of the station, the controller configured, while displaying only the primary service set identification to a user of the station, to employ the secondary service set identification for online sign-up of the station for service at the access point, and the controller further configured to, after receiving a certificate generated for the station, use the primary service set identification to establish access for the station via the access point.

10. The station of claim 9, wherein a basic service set of the primary service set identification and the secondary service set identification have a same coverage area, a same time synchronization function, and a same Information Element.

11. The station of claim 9, wherein the controller is configured to receive a vendor specific information element indicating correspondence between the primary service set identification and the secondary service set identification and correspondence between a primary basic service set identification and a secondary basic service set identification for online sign-up.

12. The station of claim 9, wherein the controller is configured to use the secondary service set identification to communicate via the access point with an online sign-up server during online sign-up.

13. An access point, comprising:
a controller configured to
provide to a station both a primary service set identification for the access point and a secondary service set identification for the access point, wherein the primary service set identification and the secondary service set identification have a one-to-one correspondence, and wherein the secondary service set identification is different from the primary service set identification and derived from the primary service set identification, the secondary service set identification stored in an information element hidden from a user of the station,
receive communications from the station employing the secondary service set identification for online sign-up of the station for service at the access point,
receive a certificate generated for the station, and
use the primary service set identification and the certificate to establish access for the station via the access point.

14. The access point of claim 13, wherein a basic service set of the primary service set identification and the secondary service set identification have a same coverage area, a same time synchronization function, and a same Information Element.

15. The access point of claim 13, wherein the controller is configured to transmit a vendor specific information element indicating correspondence between the primary service set identification and the secondary service set identification and correspondence between a primary basic service set identification and a secondary basic service set identification for online sign-up.

16. The access point of claim 13, wherein the controller is configured to receive communications from the station using the secondary service set identification to communicate via the access point with an online sign-up server during online sign-up.

\* \* \* \* \*